(12) United States Patent
Krishnamoorthy et al.

(10) Patent No.: US 7,818,352 B2
(45) Date of Patent: Oct. 19, 2010

(54) CONVERTING SPARQL QUERIES TO SQL QUERIES

(75) Inventors: Karthick Krishnamoorthy, Chennai (IN); Raman Kumar, Bihar (IN); Rajdeep S. Dua, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 11/945,110

(22) Filed: Nov. 26, 2007

(65) Prior Publication Data

US 2009/0138437 A1 May 28, 2009

(51) Int. Cl.
*G06F 17/30* (2006.01)
(52) U.S. Cl. .................. 707/803; 707/760; 707/792
(58) Field of Classification Search .............. 707/1–5, 707/100, 102
See application file for complete search history.

(56) References Cited

U.S. PATENT DOCUMENTS

| 6,418,448 | B1 | 7/2002 | Sarkar |
| 6,925,457 | B2 | 8/2005 | Britton et al. |
| 2004/0210552 | A1 | 10/2004 | Friedman et al. |
| 2006/0036620 | A1 | 2/2006 | Bigwood et al. |
| 2006/0041871 | A1 | 2/2006 | Friedman et al. |
| 2008/0040308 | A1* | 2/2008 | Ranganathan et al. .......... 707/1 |
| 2008/0256026 | A1* | 10/2008 | Hays ............................. 707/2 |

OTHER PUBLICATIONS

Artem Chebotko et al, Semantics Preserving SPARQL-to-SQL Query Translation for Optional Graph Patterns, May 2006, Wayne State University Department of Computer Science, 15 pages.*

Artem Chebotko, et al. Extending Relational Databases with a Nested Optional Join for Efficient Semantic Web Query Processing. http://www.cs.wayne.edu/~artem/main/research/TR-DB-112006-CALF.pdf. Last accessed Jun. 4, 2007.
SPARQLQuery Language for RDF http://www.w3.org/TR/2004/WD-rdf-sparql-query-20041012/. Last accessed Jun. 4, 2007.
14.2. RDF and SPARQL API and SQL. 1999-2006 OpenLink Software http://docs.openlinksw.com/virtuoso/rdfapiandsql.html. Last accessed Jun. 4, 2007.
Orri Erling, et al. Mapping Relational Data to RDF in Virtuoso http://virtuoso.openlinksw.com/wiki/main/Main/VOSSQLRDF. Last accessed Jun. 4, 2007.
Kate Byrne. Tethering Cultural Data with RDF. http://www.ltg.ed.ac.uk/np/publications/ltg/papers/Byrne2006Tethering.pdf. Last accessed Jun. 4, 2007.
Artem Chebotko, et al. Relational Nested Optional Join for Efficient Semantic Web Query Processing http://www.cs.wayne.edu/~shiyong/papers/waim07.pdf. Last accessed Jun. 4, 2007.
Eugene Inseok Chong, et al. An Efficient SQL-based RDF Querying Scheme. Proceedings of the 31st VLDB Conference, Trondheim, Norway, 2005. http://www.oracle.com/technology/tech/semantic_technologies/pdf/vldb_2005.pdf. Last accessed Jun. 4, 2007.

* cited by examiner

*Primary Examiner*—Cam-Linh Nguyen
(74) *Attorney, Agent, or Firm*—Turocy & Watson, LLP

(57) ABSTRACT

RDF store database designs and efficient techniques for converting SPARQL queries to SQL queries are described that provide faster triplet access, and which can reduce the computational overhead and cost associated with storing large volumes of RDF metadata. In various embodiments RDF data can be stored in de-normalized tables tailored to provide efficient query and storage performance. The provided query conversion techniques provide reliable and efficient query performance.

20 Claims, 16 Drawing Sheets

DE-NORMALIZED TABLE

| Graph | | |
|---|---|---|
| GraphId | bigint | |
| GraphName | nvarchar(100) | |

302
304 — GraphId
306 — GraphName

| Statement | |
|---|---|
| GraphId | bigint |
| Subject | nvarchar(Max) |
| Predicate | nvarchar(Max) |
| Object | nvarchar(Max) |
| Reified | nvarchar(Max) |
| SubjectType | int |
| PredicateType | int |
| ObjectType | int |
| Csubject | checksum |
| Cpredicate | checksum |
| CObject | checksum |

308

310 — GraphId
312 — Subject
314 — Predicate
316 — Object
318 — Reified
320 — SubjectType
322 — PredicateType
324 — ObjectType
326 — Csubject
328 — Cpredicate
330 — CObject

CONVERTING SPARQL QUERIES TO SQL QUERIES

TECHNICAL FIELD

The subject disclosure relates to database techniques and more specifically to techniques for converting SPARQL queries to SQL queries.

BACKGROUND

Resource Description Framework (RDF) is a family of World Wide Web Consortium® (W3C®) specifications originally designed as a metadata model. Typically, RDF is described as a language for representing information about resources in the World Wide Web, but can be used in a more generalized manner for modeling information. The RDF metadata model is based on an idea of making statements about resources in the form of subject-predicate-object expressions (e.g., triplets or RDF triplets). Typically, a subject denotes a resource, and a predicate denotes traits or aspects of the resource and expresses a relationship between the subject and an object. For example, one way to represent the notion "The car has the color silver" in an RDF triplet is a subject denoting "the car", a predicate denoting "has the color", and an object denoting "silver".

RDF statements made about online resources typically comprise a subject (e.g., a resource typically named by a Uniform Resource Identifier (URI)), a predicate (e.g., a resource representing a relationship), and an object is a resource or a Unicode string literal. Typically, a body of knowledge modeled by a collection of RDF statements can be subjected to reification where each RDF triplet can be assigned a URI and treated as a resource about which additional statements can be made. For example, the statement "MSN.com® says that Alan is the author of article X" illustrates this concept. As reification can be useful to determine trustworthiness or utility of a statement, one criticism of RDF is the ambiguous handling of the ability to reify such statements. A further of RDF criticism is that the triplet notation lacks the capacity to model more complex bodies of information.

Typically, once a collection of RDF metadata about resources has been stored (e.g., in one or more RDF graphs) this data is subjected to queries. RDF query languages can be used to write expressions that are evaluated against one or more RDF graphs in order to produce, for example, a narrowed set of statements, resources, or object values, or to perform comparisons and operations on such items. In addition, RDF queries can be used by knowledge management applications as a basis for inference actions.

Although several query languages for RDF graphs have emerged, typically, RDF graphs are queried using the emerging de facto standard, Simple Protocol and RDF Query Language (SPARQL), which is modeled loosely after Structured Query Language (SQL). While SPARQL can be used to express complex queries across diverse data sources (e.g., stored natively as RDF or viewed as RDF via middleware), it suffers from relatively narrow deployment in addition to forcing the user to learn a new query language. Moreover, as a relatively new query language it does not benefit from many years of optimization research surrounding other query languages (e.g., SQL). Such disadvantages can hinder the adoption of SPARQL and thus RDF itself.

As applied to collections of resources on the World Wide Web, it is apparent that the potential volume of information that could be stored in RDF graphs is virtually limitless, limited only by available storage capacity. In addition, the stored RDF metadata must be efficiently retrieved to be of any practical use. Thus two simultaneous objectives require designs for storing large volumes of RDF metadata while providing the ability to retrieve them quickly and efficiently (e.g., RDF Store).

Conventional implementations of RDF Store and SPARQL suffer from the basic limitation that results from using a database design in normalized form. As a result of this design, SPARQL queries are typically executed against in-memory RDF Data structures, rather than directly querying the backend. This can lead to out-of-memory errors, which are only exacerbated as the volume of queried RDF Data grows. This design also demands expensive high-performance hardware with relatively higher memory capability to handle the large volumes of RDF Data in real time (e.g., milliseconds response time). Thus, a fast storage and retrieval mechanism for RDF metadata is desired that can leverage conventional relational database management systems, techniques, and expertise, rather than the conventional method of using "triple stores," that suffers from scalability issues. For example, even a simple query has been shown to take 1.5 seconds on a 200 million triple store. In addition, a lack of specified standards for converting SPARQL queries to SQL queries, prevents such implementations because SPARQL typically requires an RDF view or endpoint to query the underlying data. As a result, a reliable algorithm to achieve this conversion is desired that allows efficient access to an RDF store leveraging conventional relational database systems.

The above-described deficiencies are merely intended to provide an overview of some of the problems encountered in RDF store database design and access techniques, and are not intended to be exhaustive. Other problems with the state of the art may become further apparent upon review of the description of the various non-limiting embodiments of the invention that follows.

SUMMARY

In consideration of the above-described deficiencies of the state of the art, the invention provides RDF store database designs and efficient techniques for converting SPARQL queries to SQL queries, related systems, and methods that are practical, can provide faster triplet access, and which can reduce the computational overhead and cost associated with storing large volumes of RDF metadata.

In consideration of the above-described limitations, in accordance with exemplary non-limiting embodiments, the invention provides RDF store database designs, and related systems and methods for faster triplet access. In various non-limiting embodiments the invention provides backend storage systems and methods that can handle large volumes of data as well as respond to SPARQL queries in milliseconds. Accordingly, various embodiments of the invention provides a de-normalized table design in a conventional relational database management system (e.g., Microsoft® SQL Server) as the RDF data store comprising a Graph Table and Statement table. The provided table designs implement key design considerations in order to improve data storage and query performance.

Accordingly, a method is provided that facilitates efficient storage of metadata comprising storing an information source name and identification number for an information source containing information resources in a first database table. The method can further include, storing attribute values for a subject, a predicate, and an object for an information resource in a de-normalized database table. In addition, the information source identification number can be stored in the de-normalized database table. The method further includes storing a type attribute value (e.g., blank, URI, or literal) and integrity check attribute value (e.g., storing a binary checksum value) for each attribute value of the subject, predicate, and object in the de-normalized database table. In related embodiments, a database management system and computer readable provide efficient storage of resource description framework metadata.

In further consideration of the above-described limitations, various embodiments of the invention provides efficient techniques and related systems for converting SPARQL queries to SQL queries, to further expedite triplet access. Accordingly, various embodiments of the invention can implement a reliable algorithm in conjunction with RDF data store design to efficiently perform the query conversion to the SQL query that the database engine understands.

One particular high-level methodology comprises receiving a query substantially conforming to a SPARQL. The query can then be parsed to extract a token list of RDF terms in the where clause of the SPARQL query. The method then applies the conversion algorithm logic to convert the query into a structured query language query, wherein structured query language query is configured to query a relational database storing data in at least one de-normalized table.

Advantageously, the various embodiments provide RDF stores that are highly available, scalable, and distributed systems, capable of storing and querying billions of data while achieving higher performance than in-memory querying.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

RDF store database designs and efficient techniques for converting SPARQL Queries to SQL Queries, and related systems and methods for faster triplet access are further described with reference to the accompanying drawings in which:

FIG. 3 depicts an exemplary non-limiting RDF data store table design according to various embodiments of the present invention;

DETAILED DESCRIPTION

Overview

Figure 1:
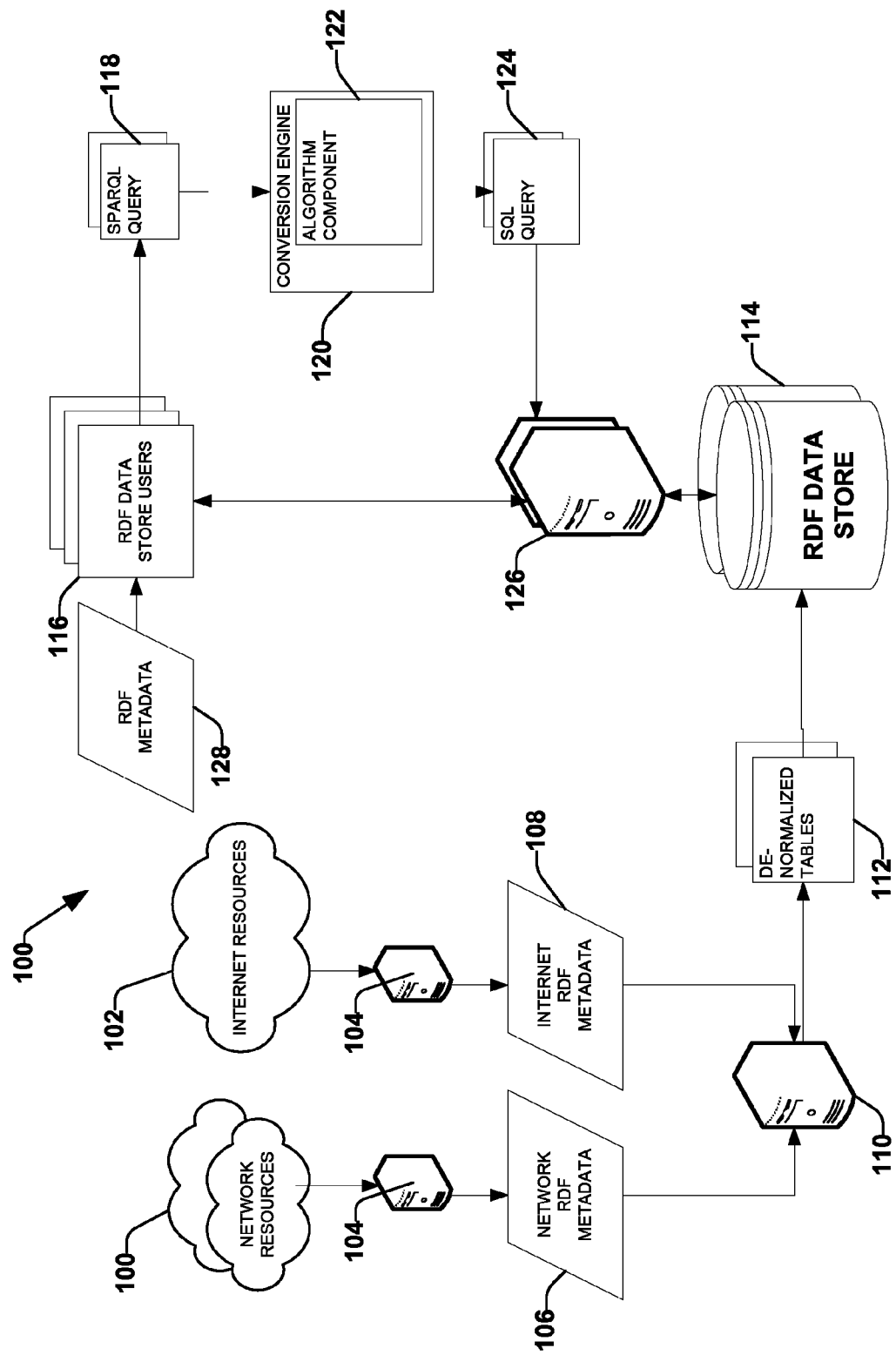
FIG. 1 illustrates an overview of an exemplary computing environment suitable for incorporation of embodiments of the present invention.

Simplified overviews are provided in the present section to help enable a basic or general understanding of various aspects of exemplary, non-limiting embodiments that follow in the more detailed description and the accompanying drawings. This overview section is not intended, however, to be considered extensive or exhaustive. Instead, the sole purpose of the following embodiment overviews is to present some concepts related to some exemplary non-limiting embodiments of the invention in a simplified form as a prelude to the more detailed description of these and various other embodiments of the invention that follow. It is understood that various modifications may be made by one skilled in the relevant art without departing from the scope of the disclosed invention. Accordingly, it is the intent to include within the scope of the invention those modifications, substitutions, and variations as may come to those skilled in the art based on the teachings herein.

As used in this application, the terms "component," "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

In addition, various embodiments of the present invention are directed to methods. It is to be understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The method claims appended hereto present elements of the various steps in a sample order, and are not meant to be limited to the specific order or hierarchy presented.

In consideration of the above-described limitations, in accordance with exemplary non-limiting embodiments, the invention provides RDF store database designs, and related systems and methods for faster triplet access. In various non-limiting embodiments the invention provides backend storage systems and methods that can handle large volumes of data as well as respond to SPARQL queries in milliseconds. Accordingly, various embodiments of the invention provides a de-normalized table design in a conventional relational database management system (e.g., Microsoft® SQL Server) as the RDF data store comprising a Graph Table and Statement table. The provided table designs implement key design considerations in order to improve data storage and query performance.

In further consideration of the above-described limitations, the invention provides efficient techniques and related systems for converting SPARQL queries to SQL queries to further expedite triplet access. Accordingly, various embodiments of the invention can implement a reliable algorithm in conjunction with RDF data store design to efficiently perform the query conversion to the SQL query that the database engine understands.

Advantageously, the various embodiments provide RDF stores that are highly available, scalable, and distributed systems, capable of storing and querying billions of data while achieving higher performance than in-memory querying.

RDF Store Database Design for Faster Triplet Access

FIG. 1 illustrates an overview of an exemplary computing environment 100 suitable for incorporation of embodiments of the present invention. Computing environment 100 comprises a number of components that facilitate creating, querying, and modifying RDF stores according to various aspects of the present invention, among other related functions. While various embodiments are described with respect to the components of computing environment 100 and the further embodiments more fully described below, one having ordinary skill in the art would recognize that various modifications could be made without departing from the spirit of the disclosed invention. Thus, it should be understood that the description herein is but one of many embodiments that may be possible while keeping within the scope of the claims appended hereto.

According to various non-limiting embodiments, computing environment can comprise RDF store database 114 specifically designed for faster triplet access. The provided RDF store database table designs implement key design considerations in order to improve data storage and query performance according to various embodiments of the invention more fully described below. In such embodiments, the invention provides backend storage systems and methods that can handle large volumes of data as well as respond to SPARQL queries 118 on the order of milliseconds. Information about resources can be collected 104 and modeled (106 108 128) according to the principles of the RDF framework via techniques known in the art. Such resources or information about resources can include, but is not limited to, local or remote network resources 100, internet resources 102, local information collections 128, and/or the like, or any combination thereof. In addition, various embodiments of the invention can include a component for storing 110 the various RDF graphs (106 108 128) in the provided de-normalized table design in a conventional relational database management system (e.g., Microsoft® SQL Server) as the RDF data store 114.

According to further non-limiting embodiments of the invention, SPARQL to SQL query conversion techniques and related systems and methods are provided. For example, RDF data store users 116 require various functions of the RDF data store 114 including, but not limited to, creating, querying, and modifying RDF stores, persisting RDF graphs, and/or the like, or any combination thereof. To that end, various embodiments of the invention include a query conversion engine 120. Conversion engine 120 performs conversion of the emerging de facto standard SPARQL queries 118 to the native SQL queries 124 in a reliable and efficient manner to provide the required functions. In a particular non-limiting embodiments of the invention, the conversion engine 120 can include an algorithm component 122 suitable for providing the required conversion. In addition, some embodiments can include computing system 126 that facilitates the some or all of functions described with respect to query conversion or required by RDF data store users 116.

It is to be appreciated that the various functions, components, or process steps can be combined or distributed via techniques known in the art or can be eliminated or reorganized according to system design considerations without departing from the scope of the claims appended hereto. For example, while the functions of collecting 104, modeling 108, and storing (112 110) internet resource information 102 into the RDF data store 114 are depicted as occurring in discrete blocks for purposes of illustration, it should be understood that such functions can be combined or distributed as desired. As a further example, system design considerations may dictate the elimination, optimization, or integration of the modeling 106 108 function where new data is being collected and a native RDF data store is not required. Furthermore, some or all of functions described with respect to query conversion or required by RDF data store users 116 can be combined, integrated with RDF data store 144 or distributed as the system design consideration dictate. Further examples of such modifications will become apparent to those skilled in the art upon review of the various embodiments disclosed and claimed herein.

Figure 2:
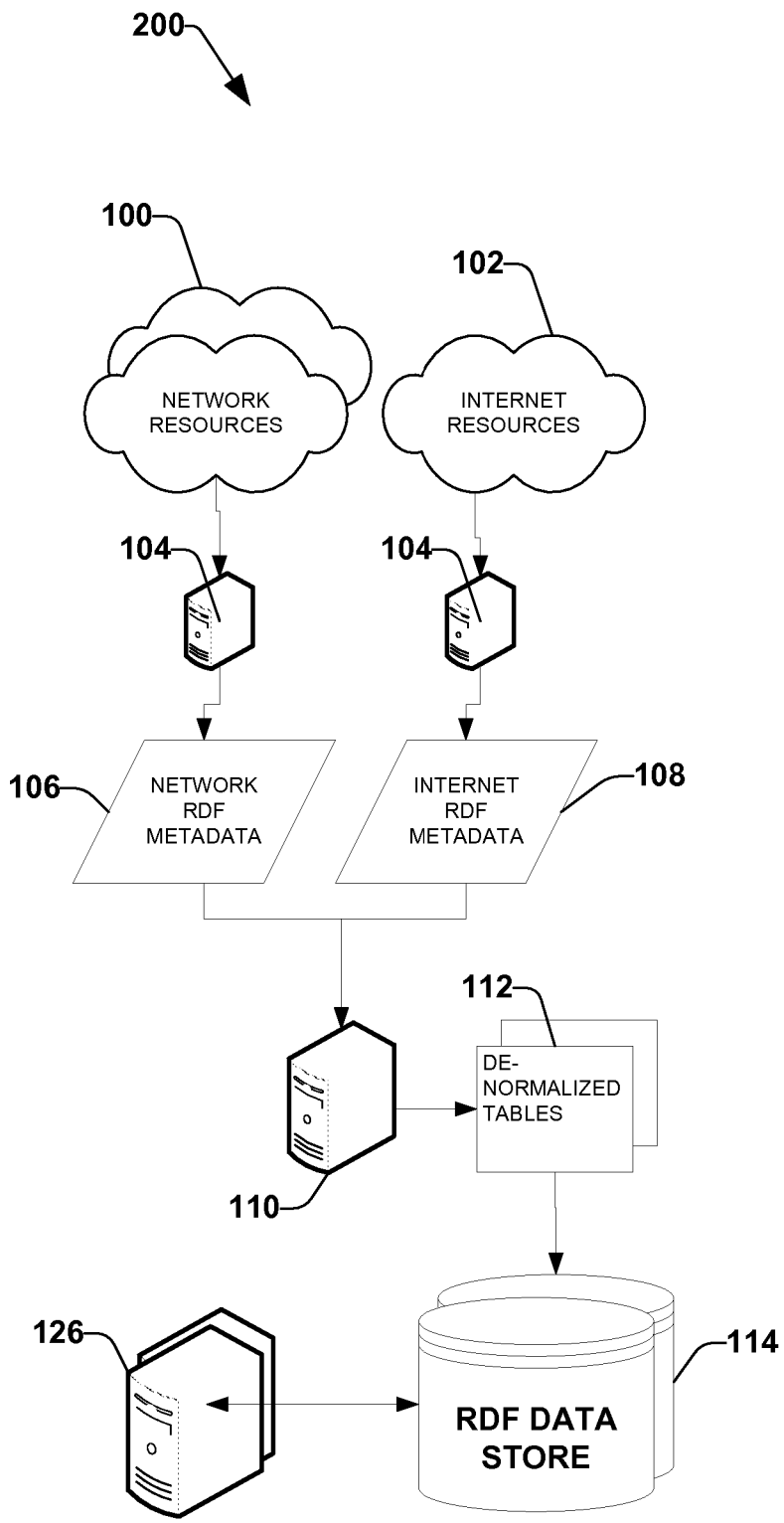
FIG. 2 illustrates an exemplary non-limiting block diagram of a system for RDF metadata storage for faster triplet access according to various embodiments of the present invention.

FIG. 2 illustrates an exemplary non-limiting block diagram of a system 200 for RDF metadata storage for faster triplet access according to various embodiments of the present invention. As briefly described above with reference to FIG. 1, various non-limiting embodiments of the invention can comprise backend storage RDF store database 114 carefully designed to handle large volumes of data, as well as respond to SPARQL Queries in millisecond response time. Accordingly, the invention implement the RDF store as a de-normalized table design 112 in a conventional relational database management system (e.g., Microsoft® SQL Server), according to various embodiments. Database normalization is typically performed for relational database tables to minimize duplication of information, which safeguards the database against certain types of logical or structural problems. For example, when multiple instances of a data element occur in a table, the possibility exists that these instances will not be kept consistent when the data within the table is updated (e.g., a loss of data integrity). A table that is sufficiently normalized can be less vulnerable to problems of this kind, if its structure reflects the user assumptions about how multiple instances of the same information should be represented. However, the particular requirements of storing large volumes RDF data and providing efficient retrieval requires an atypical approach. In particular non-limiting embodiments of the invention, a de-normalized table design can comprise two tables (e.g., a Graph Table and a Statement Table). A particular de-normalized table design is described in reference to FIG. 3 according to various aspects of the invention. The RDF store database designs of the present invention advantageously provide RDF stores that are highly available, scalable, and capable of storing and querying billions of data while achieving higher performance than in-memory querying through careful design keeping query performance as a prime consideration.

FIG. 3 depicts an exemplary non-limiting technique for RDF data store table design 300 according to various embodiments of the present invention. As described, particular non-limiting embodiments of the invention can utilize a de-normalized table design comprising two tables (e.g., a graph table and a statement table). The provided table designs solve the problem of storage of large volumes of RDF data while simultaneously facilitating faster retrieval. As described above, typical native RDF data is stored in the graph or tree format where nodes can have connections between them. According to various embodiments, this native RDF structure can be stored in the provided table designs to advantageously eliminate the need for querying in-memory structures typical of such native RDF implementations. Accordingly, a particular non-limiting table design can comprise a Graph Table 302, which can store named graphs 306 along with a respective identification number 304, and a Statement Table 308, which can store, among the other items, the triplets (e.g., subject 312, predicate 314, and object 316) or SPO. Additionally, consideration of query performance has lead to the inclusion of the SPO type, subjecttype 320, predicatetype 322, and objecttype 324 in the Statement Table 308.

In addition to improving the SPARQL query performance, the design decision to include the SPO types (320-324) in the same Statement Table 308 (e.g., rather than maintaining a separate table having statement identification and SPO types) advantageously facilitates faster storing and loading of the RDF graph. Typically, these SPO types (320-324) can represent whether the SPO is a Blank, Uniform Resource Locator or Uniform Resource Identifier (collectively URL) or Literal (e.g., constant values represented by character strings) type. Moreover, the provided table designs further improve performance by including integrity check values (e.g., binary checksum values of the SPO (312-316)) csubject 326, cpredicate 328, and cobject 330, in the Statement Table 308, because comparing checksums is typically much faster than comparing character values. Additionally, the table can indicate whether the particular resource can be reified 318.

Figure 4:
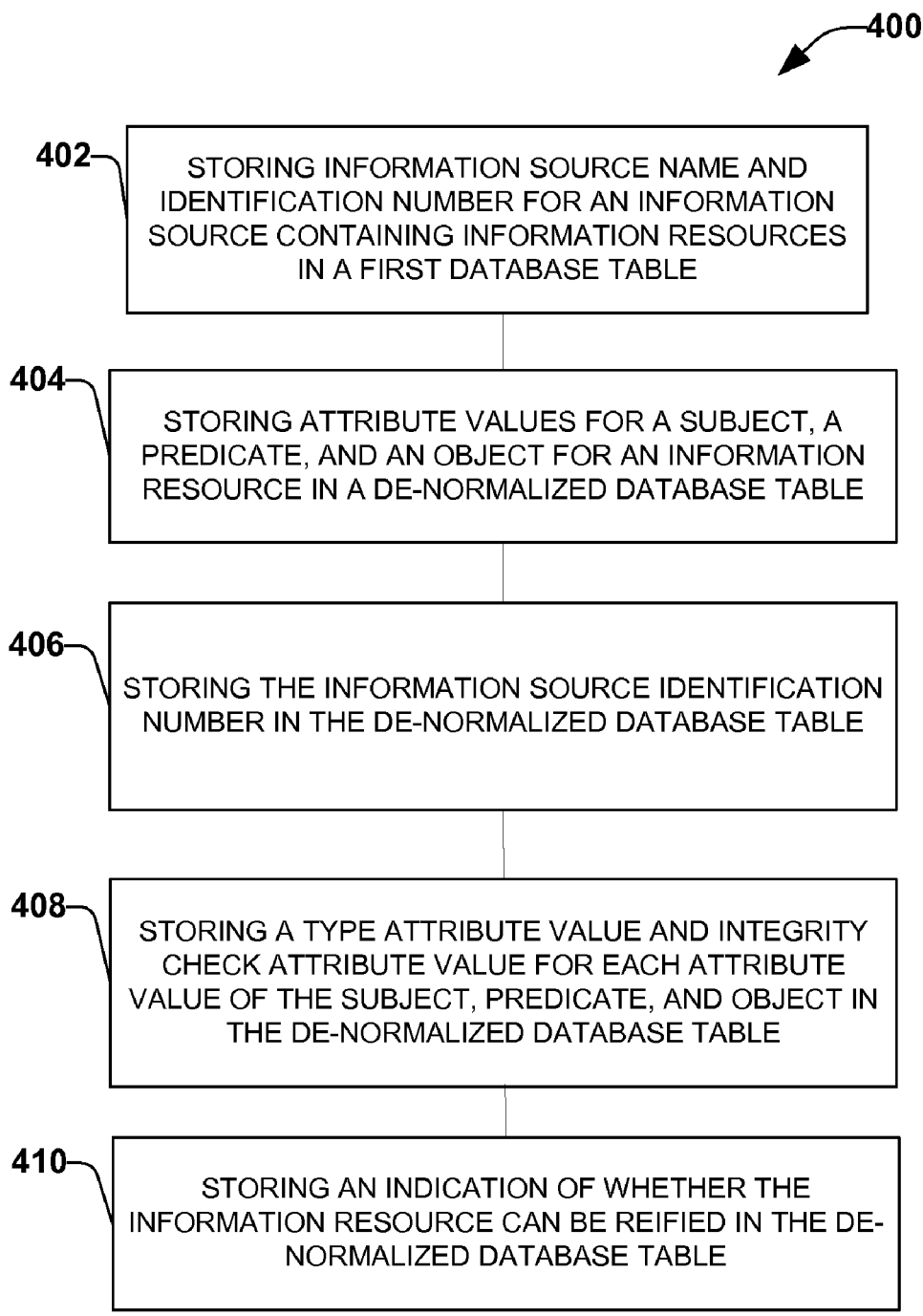
FIG. 4 illustrates a particular non-limiting high level methodology for RDF metadata storage for faster triplet access according to various aspects of the present invention.

FIG. 4 illustrates a particular non-limiting high-level methodology for RDF metadata storage for faster triplet access according to various aspects of the present invention. Accordingly a method is provided that facilitates efficient storage of metadata comprising storing an information source name 306 and identification number 304 for an information source containing information resources in a first database table 302 at 402. At 404, the method further includes, storing attribute values for a subject 312, a predicate 314, and an object 316 for an information resource in a de-normalized database table 308. In addition, at 406, the information source identification number 304 can be stored in the de-normalized database table 308. The method further includes (408) storing a type attribute value (320-324) (e.g., blank, URI, or literal) and integrity check attribute value (326-330) (e.g., storing a binary checksum value) for each attribute value of the subject 312, predicate 314, and object 316 in the de-normalized database table 308. The method can additionally comprise storing 410 an indication of whether the information resource can be reified 318 in the de-normalized database table 308. Furthermore, the method can include mapping an existing classification of the information source to the second database table 308, storing the associated tables (302 308) in a relational database compatible with structured query language, and providing an external interface (e.g., an application programming interface) for receiving from a client process, an information resource for storage in the relational database management system.

Figure 5:
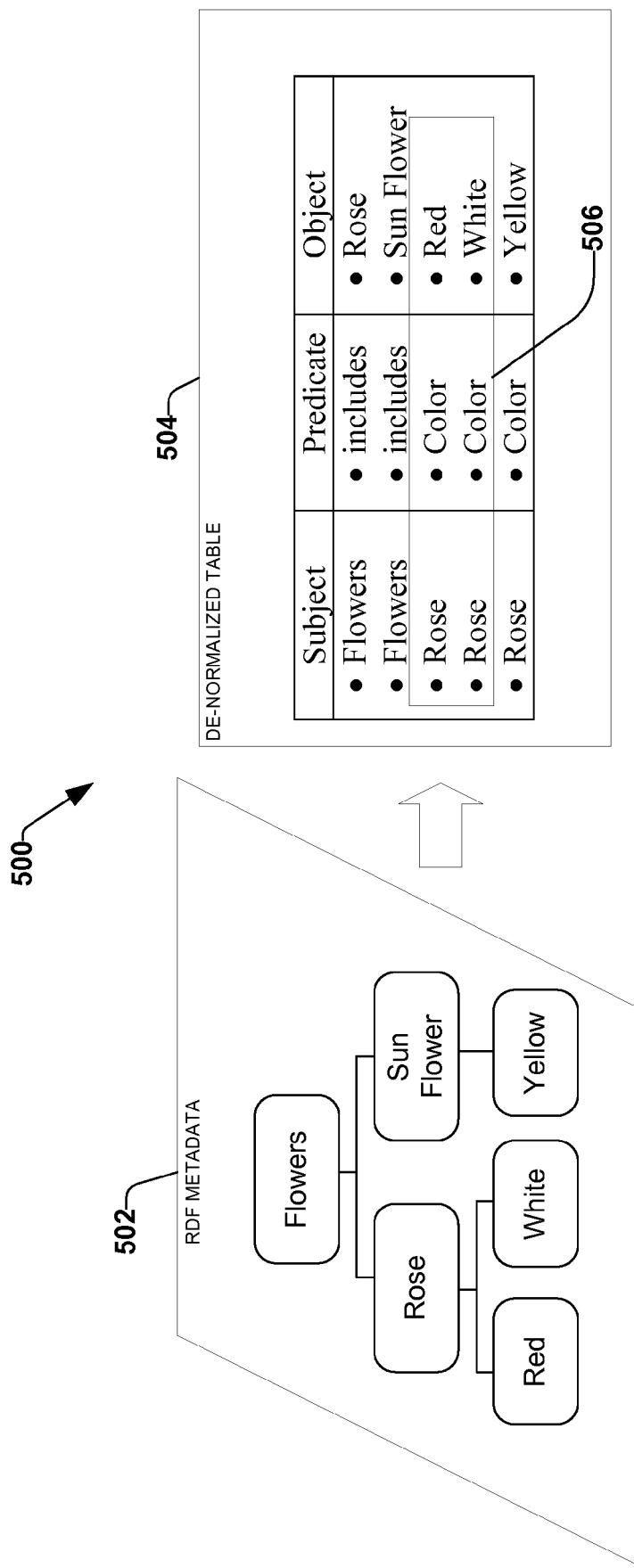
FIG. 5 presents a non-limiting example of a conversion from an RDF graph to a de-normalized database table according to particular aspects of the present invention.

FIG. 5 presents a non-limiting example 500 of a conversion from an RDF graph 502 to a de-normalized database table 504 according to particular aspects of the present invention. For example, the flowers RDF graph can be converted (e.g., mapped) to de-normalized table 504 data base format. FIG. 5 illustrates at least one aspect of the atypical choice of a de-normalized table design. For instance table 504 can be said to not be in first normal form (1NF) at least because the duplicate entries in any of the three possible attributes (e.g., subject, predicate, object) which may be used as a key (e.g., there is no unique key for this database table). Another way of describing this situation is that the table 504 does not faithfully represent the subject-object relation 506 for rose, which can be either red or white.

Figure 6:
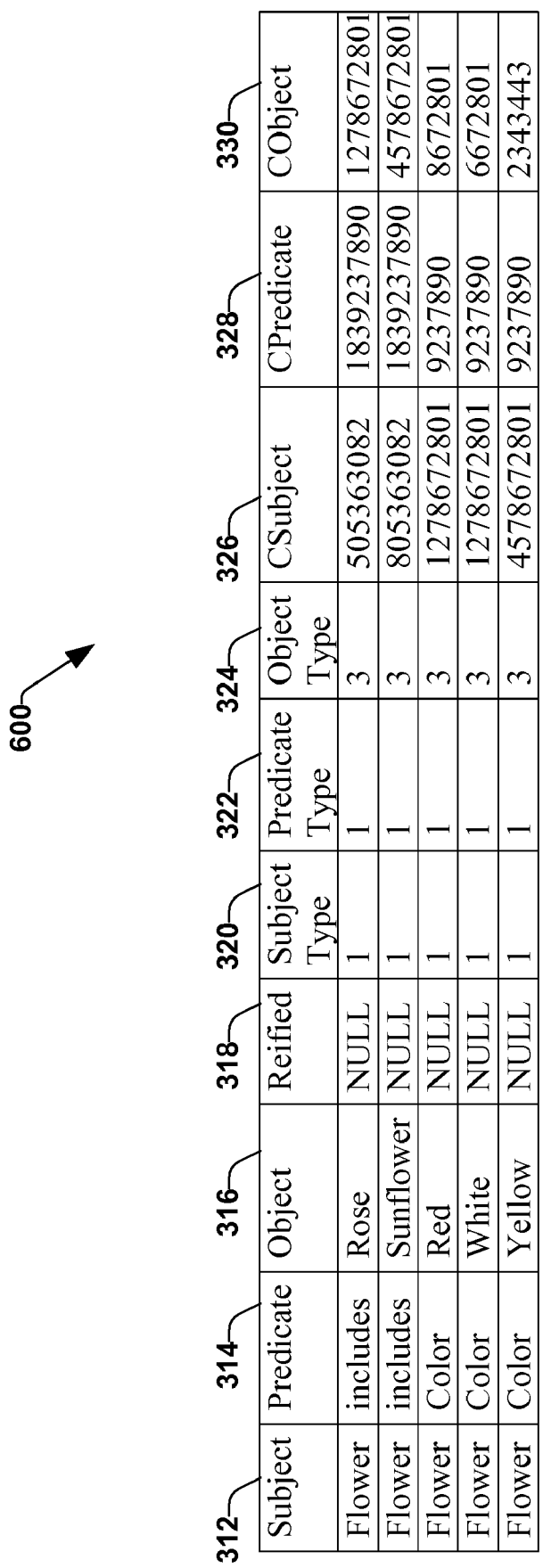
FIG. 6 presents a further non-limiting example of a conversion from an RDF graph to a de-normalized database table according to further aspects of the present invention.
Figure 7:
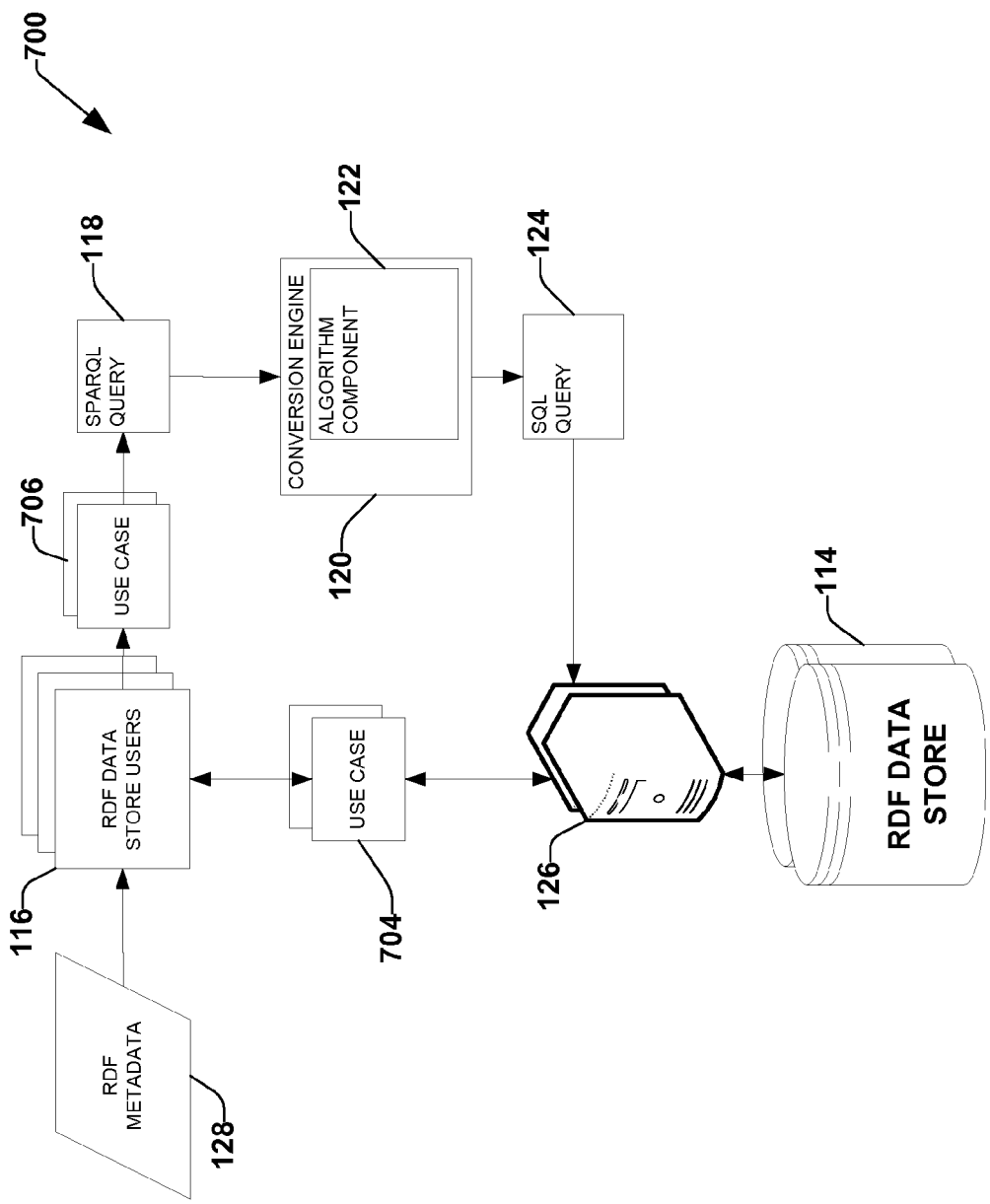
FIG. 7 illustrates an exemplary non-limiting block diagram of a system for practicing various aspects of the present invention.
Figure 8A:
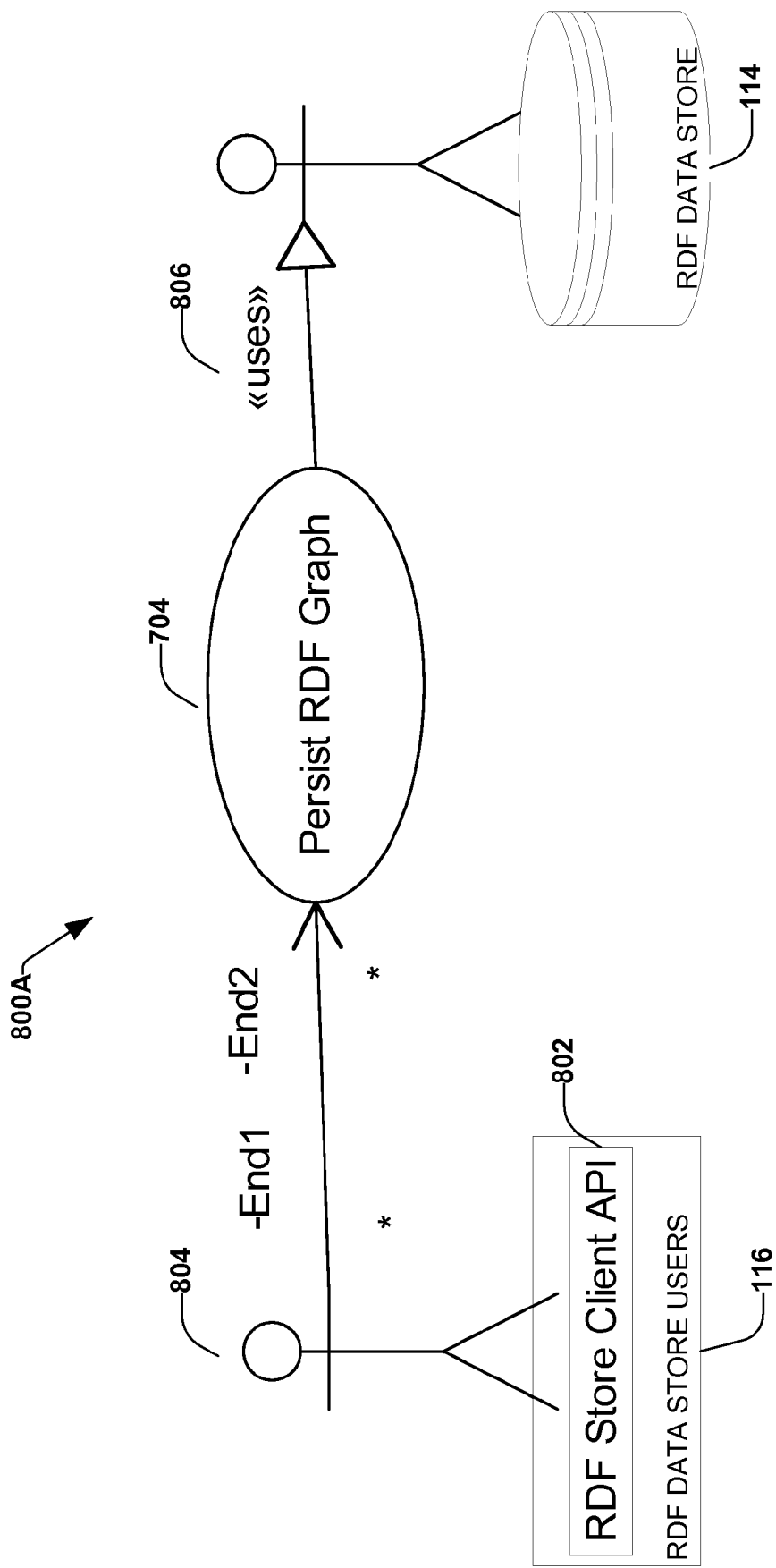
FIGS. 8A and 8B present particular non-limiting example use cases of the RDF store according to various aspects of the present invention.
Figure 8B:
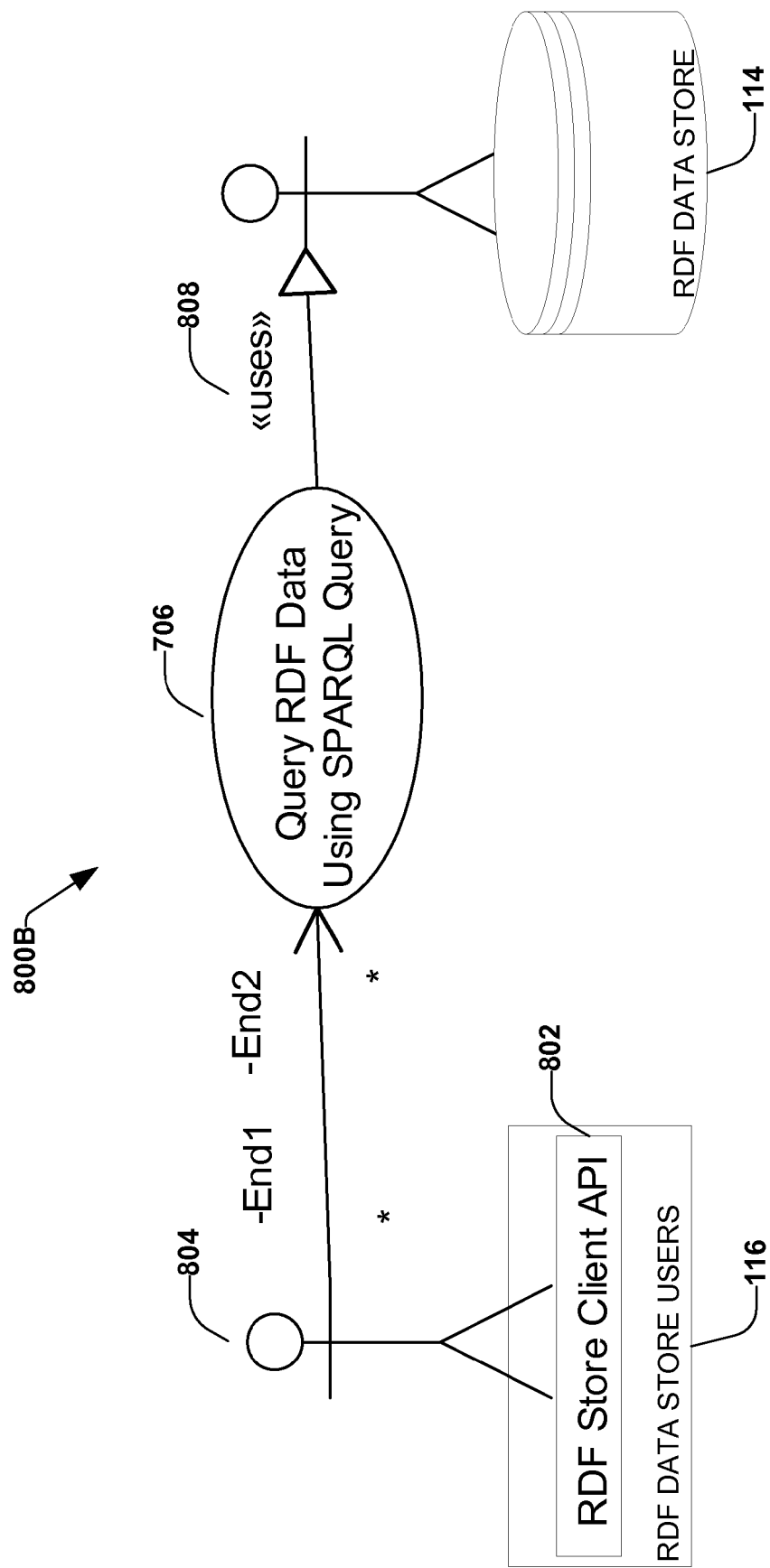

FIG. 6 presents a further non-limiting example of a conversion from an RDF graph to a de-normalized database table 600 according to further aspects of the present invention. As can be seen, the subject, predicate, and object columns (312-316) replicate table 504. Additionally, the various columns described above with respect to FIG. 3 have been appended to provide the described improvements in RDF storage and query performance. According to further non-limiting embodiments, a FIG. 7 illustrates an exemplary non-limiting block diagram of a system 700 for practicing various aspects of the present invention. As briefly described above with reference to FIG. 1, various non-limiting embodiments of the invention can comprise backend storage RDF store database 114 carefully designed to handle large volumes of data, as well as respond to SPARQL Queries in millisecond response time. Accordingly, use cases 704 and 706 are depicted for the purposes of describing the particular use cases that follow. In addition to referring to interaction via computing system 126, use cases 704 should be understood to encompass those functions previously described with reference to previously described components 100-112. Subject to FIGS. 8A and 8B present particular non-limiting example use cases 800A and 800B of the RDF store according to various aspects of the present invention. FIG. 8A illustrates an exemplary non-limiting use case 800A of persisting RDF graphs 704 to RDF store 114. RDF Store Client (Application Programming Interface) API 802 facilitates RDF Store Client API actor 804, as a member of RDF store data users 116, to communicate with the persist RDF Graph use case 704, which in turn uses the RDF Store at 806 to persist the details. While for purposes of illustration, the external actor is represented in human form, it should be understood that the invention is not so limited. For example, it should be obvious to one of skill in the art that actions taken by actor 804 can be and, in many cases preferably are, performed by computer related entities operable to perform the described functions and the like, and can be exposed externally with respect to RDF store 114 or internally as is understood in the art.

FIG. 8A illustrates an exemplary non-limiting use case 800B of executing a SPARQL query 706 on RDF store 114. RDF Store Client API 802 facilitates RDF Store Client API actor 804, as a member of RDF store data users 116, to communicate with the query RDF data using SPARQL query use case 706, which in turn uses the RDF Store at 808 to query the results. While for purposes of illustration, exemplary use cases have been described with reference to FIGS. 7-8, it should be understood that the various functions provided by such uses cases to RDF data store users 116 includes, without limitation, creating, querying, and modifying RDF stores, persisting RDF graphs, and/or the like, or any combination thereof.

Converting SPARQL Queries to SQL Queries

Figure 9:
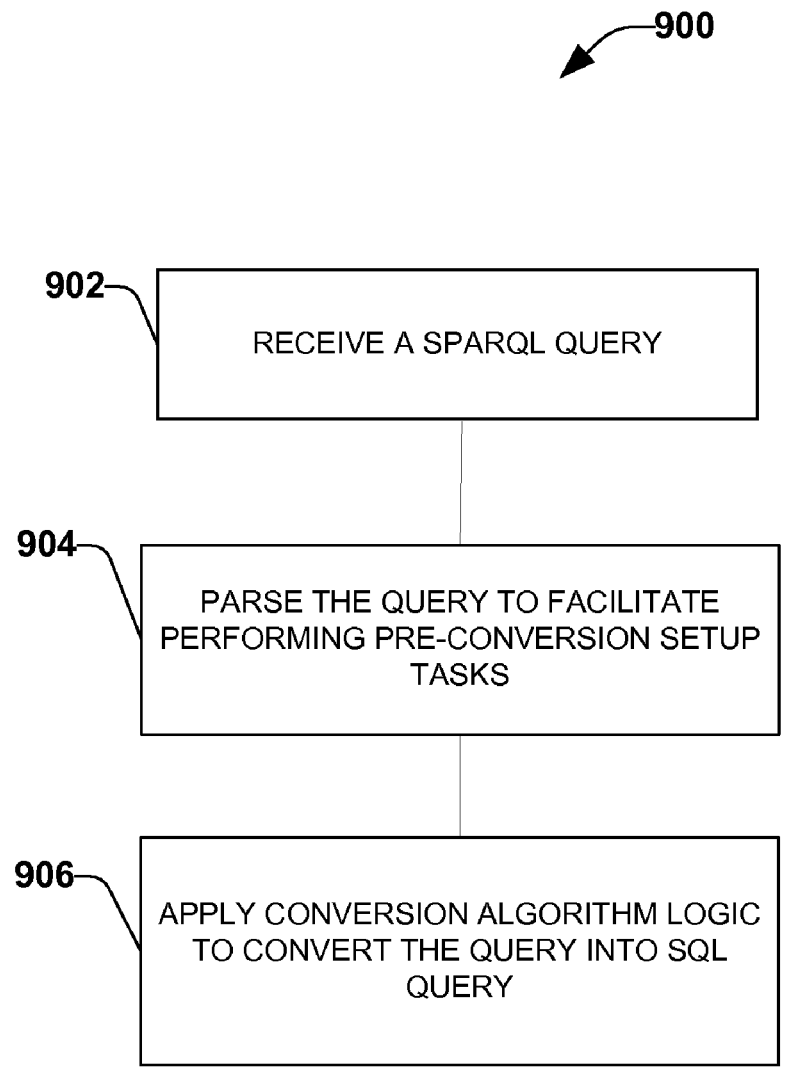
FIG. 9 illustrates a particular non-limiting high level methodology for efficient SPARQL to SQL query conversion according to various aspects of the present invention.

As can be seen from to FIGS. 7-8, a mechanism is required to convert to SPARQL queries into the native SQL query language of RDF data store 114. Accordingly, FIG. 9 illustrates a particular non-limiting high level methodology 900 for efficient SPARQL to SQL query conversion according to various aspects of the present invention. In various aspects of the invention, the methodologies can query the RDF data store database (e.g., Microsoft SQL Server) using a reliable algorithm, to efficiently convert the SPARQL query to a SQL query. One particular high-level methodology comprises receiving a query substantially conforming to a SPARQL at 902. At 904, the query can be parsed to facilitate performing pre-conversion setup tasks. For instance, the query can be parsed for example, to generate an input list to provide to a conversion algorithm (e.g., generate a token list of RDF terms in the where{ } clause of the SPARQL query, create a count of triples in the where{ } clause of the SPARQL query, create a list of variables to be selected by the input SPARQL query, and/or the like, or any combination thereof), to collect or assemble other relevant data for the conversion algorithm, and provide other required services or routines prior to application of the conversion algorithm (e.g., spoken language translation, IP address conversion or translation, DNS lookup, etc.), and/or the like or any combination thereof. The method then applies the conversion algorithm logic to convert the query into a structured query language query at 906, wherein structured query language query is configured to query a relational database storing data in at least one de-normalized table.

Figure 10A:
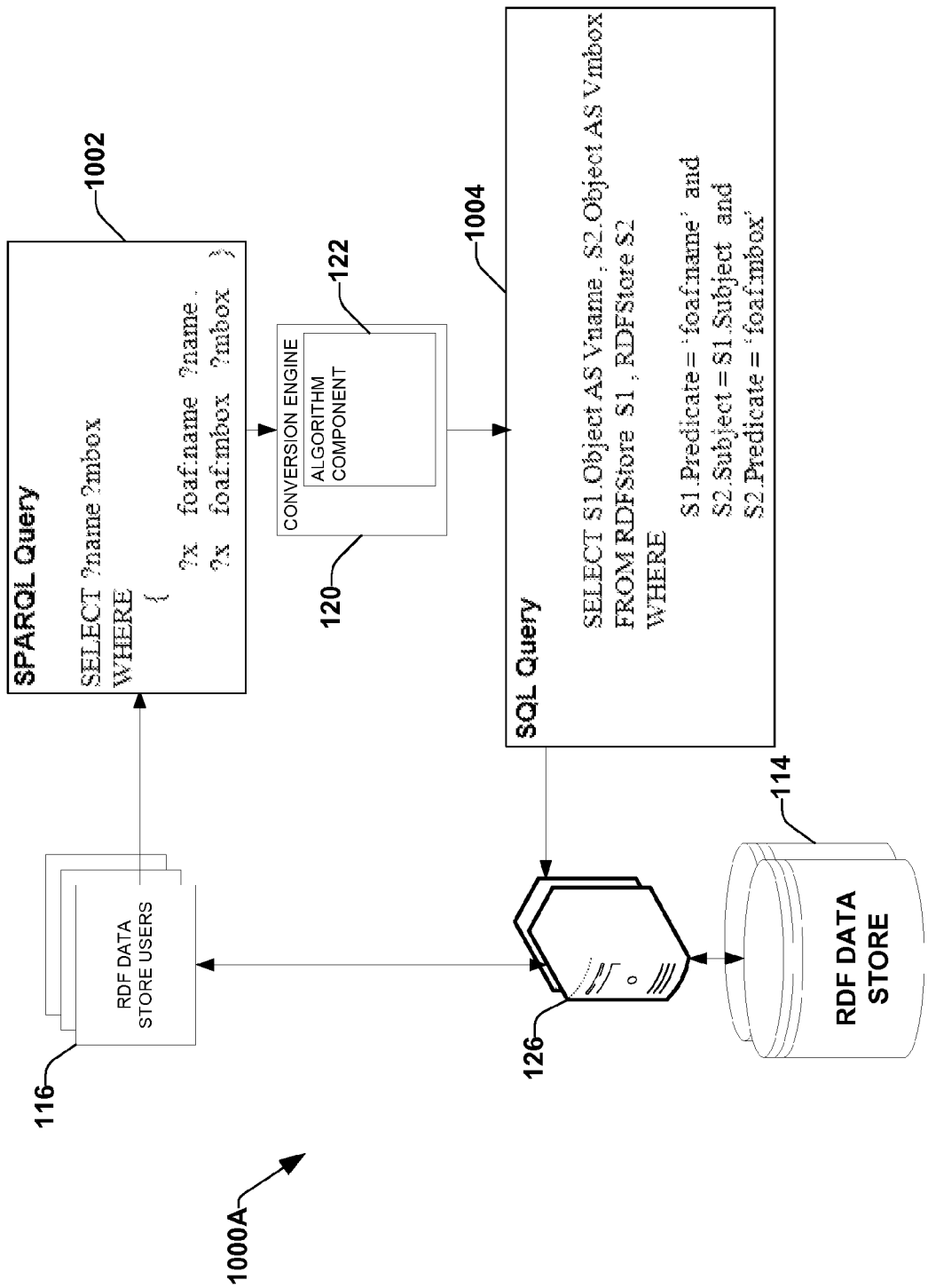
FIG. 10A illustrates an exemplary non-limiting block diagram of a system for SPARQL to SQL query conversion according to various embodiments of the present invention.

FIG. 10A illustrates an exemplary non-limiting block diagram of a system for SPARQL to SQL query conversion according to various embodiments of the present invention. As described above with reference to FIGS. 1 and 7, various non-limiting embodiments of the invention can comprise backend storage RDF store database 114 to handle large volumes of data, as well as respond to SPARQL Queries. In addition, RDF data store users 116 require various functions of the RDF data store 114 including, but not limited to, creating, querying, and modifying RDF stores, persisting RDF graphs, and/or the like, or any combination thereof. Accordingly, various embodiments of the invention include a query conversion engine 120. Query conversion engine 120 performs conversion of SPARQL queries 118 to the native SQL queries 124 in a reliable and efficient manner to provide the required functions. In a particular non-limiting embodiments of the invention, the conversion engine 120 can include an algorithm component 122 suitable for providing the required conversion. In addition, some embodiments can include computing system 126 that facilitates the some or all of functions described with respect to query conversion or required by RDF data store users 116.

Referring again to the use case 706 in FIG. 8B, an RDF data store user 116 can submit a SPARQL query 1002 to the conversion engine 120. The conversion engine 120, through operation of algorithm component 122 and any related functions (not shown), converts the SPARQL query 1002 to the SQL query 1004, to query the results from the RDF data store 114. The SQL query is depicted 1004 after application of the algorithm component 122. It should be understood that these exemplary non-limiting queries (1002 1004) are but one example of the possible functions made available via the conversion engine 120 and algorithm 122.

Figure 10B:
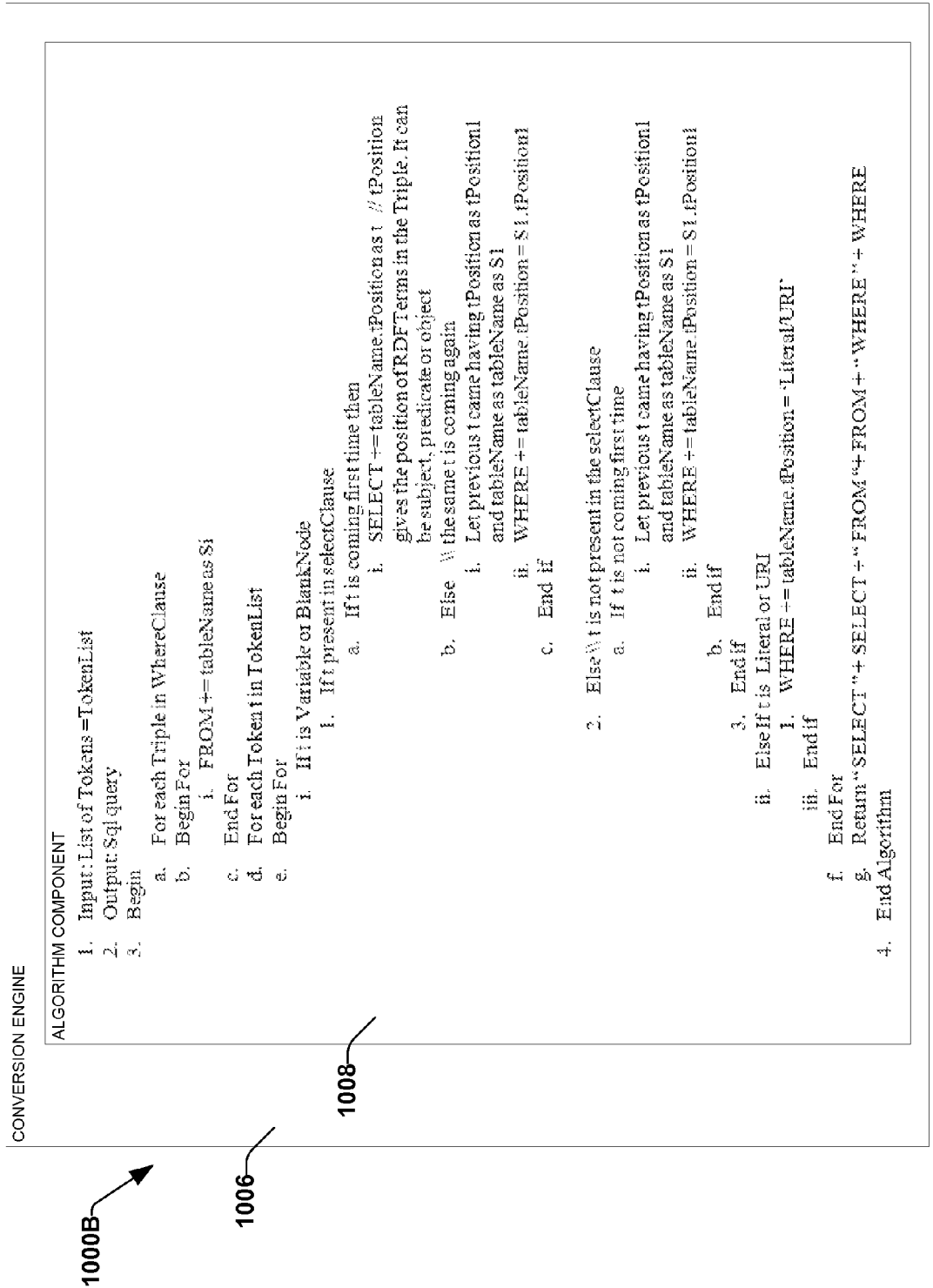
FIG. 10B illustrates an exemplary non-limiting SPARQL to SQL query conversion algorithm according to various embodiments of the present invention.

FIG. 10B illustrates an exemplary non-limiting SPARQL to SQL query conversion algorithm 1008 according to various embodiments of the present invention. Algorithm 1008 comprises logic that can facilitate converting SPARQL queries to SQL queries. According to various embodiments, the example algorithm 1008 can be extended in several conditions to fit different types of SPARQL queries inside the SPARQL-to-SQL conversion engine 120.

Figure 10C:
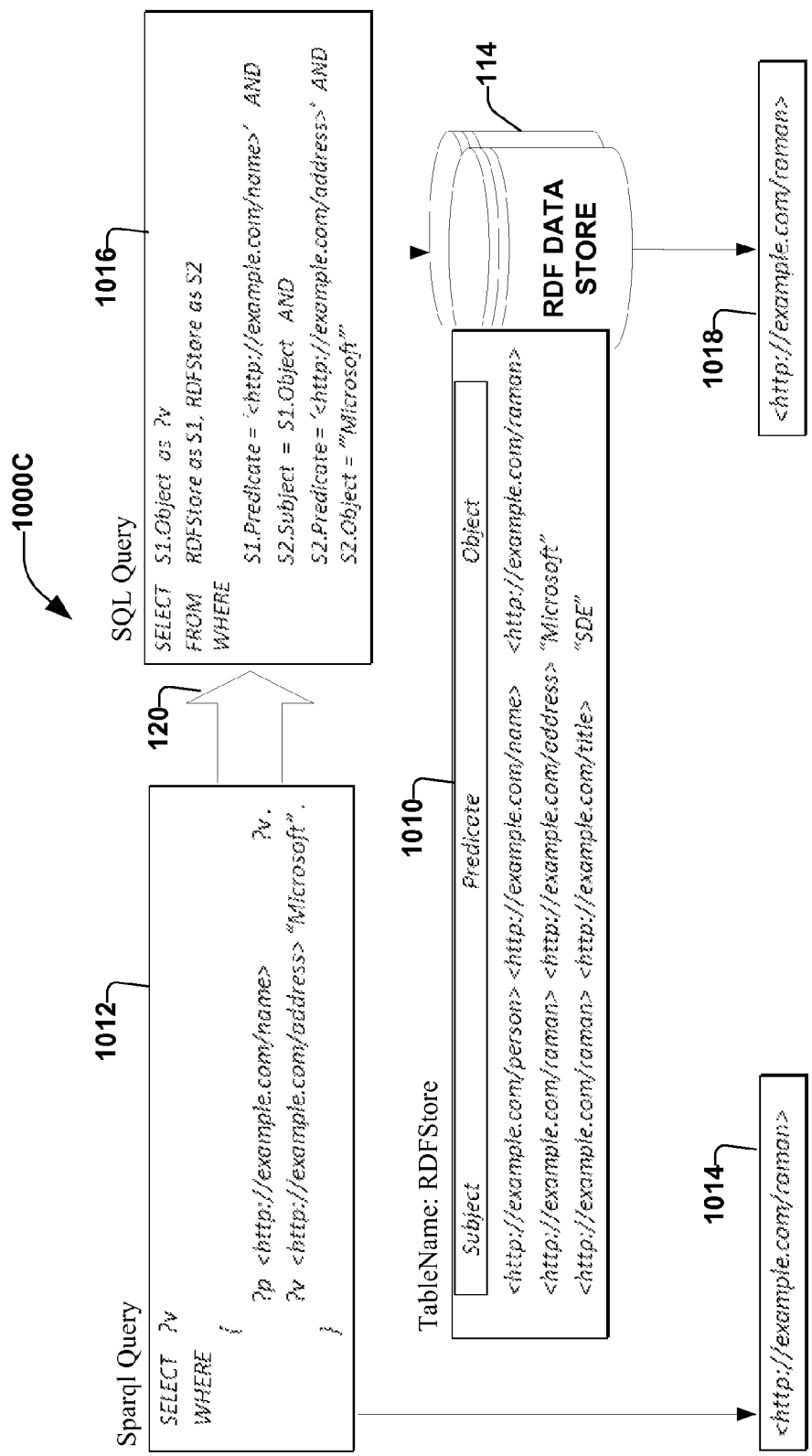
FIG. 10C illustrates an exemplary non-limiting block diagram of a SPARQL to SQL query conversion according to various embodiments of the present invention.

FIG. 10C illustrates an exemplary non-limiting block diagram of a SPARQL to SQL query conversion according to various embodiments of the present invention. For example, RDF data can be stored in a database table 1010 as a collection of triples as described herein. An exemplary SPARQL query 1012, configured to query the RDF data, can return a (e.g., the result at 1014). As can be seen, the exemplary SPARQL query 1012 where{ } clause comprises two triples:

for example, Triple1 is [?p<http://example.com/name>?v], and

Triple2 is [?v<http://example.com/address> "Microsoft"].

The triples further comprise:
two variables (e.g., ?p and ?v),
two URIs (e.g., <http://example.com/name> and <http://example.com/address>), and
one Literal ("Microsoft").

According to various non-limiting embodiments of the present invention, SPARQL query 1012 can be parsed prior to conversion by the algorithm component of conversion engine 120 to create an input list. For instance, SPARQL query 1012 can be parsed to create an input list for a conversion algorithm component (e.g., 120) creating an input list comprising a TokenList (e.g., a list of RDF terms within the where{ } clause of a SPARQL query where RDF terms are referred to as tokens, which can be of type BlankNode, URI, Literal, or Variable), TripleCount (e.g., a count of triples within the where{ } clause such as one third of total number of RDF terms inside where{ } clause of a SPARQL query), and a SelectList (e.g., a list of variables to be selected by an input SPARQL query). For example, when SPARQL query 1012 is parsed to create an exemplary input list comprising the aforementioned elements, SelectList can contain {?v}, TripleCount can be 2, and TokenList can contain {?p, <http://example.com/name>, ?v, ?v, <http://example.com/address>, "Microsoft"}.

In addition, according to further non-limiting embodiments of the invention, a set of output variables for building an output query can be initialized. For example, prior to applying conversion algorithm 122, a set of string variables can be initialized by conversion engine 120, for example, such set of string variables can comprise FROM (e.g., a string variable for which FROM clause of an output SQL query can be built), SELECT (e.g., a string variable which is building SELECT clause of SQL Query), and WHERE (e.g., a string variable for which a WHERE clause of an output SQL Query can be built) as indicated in example output SQL query 1016. According to various embodiments of the invention, the conversion engine 120 can then return a corresponding SQL representation of the SPARQL query, which facilitates query of the RDF data store 114 version 1010 of the collection of RDF data to return the same result 1018 as result 1014.

Figure 10D:
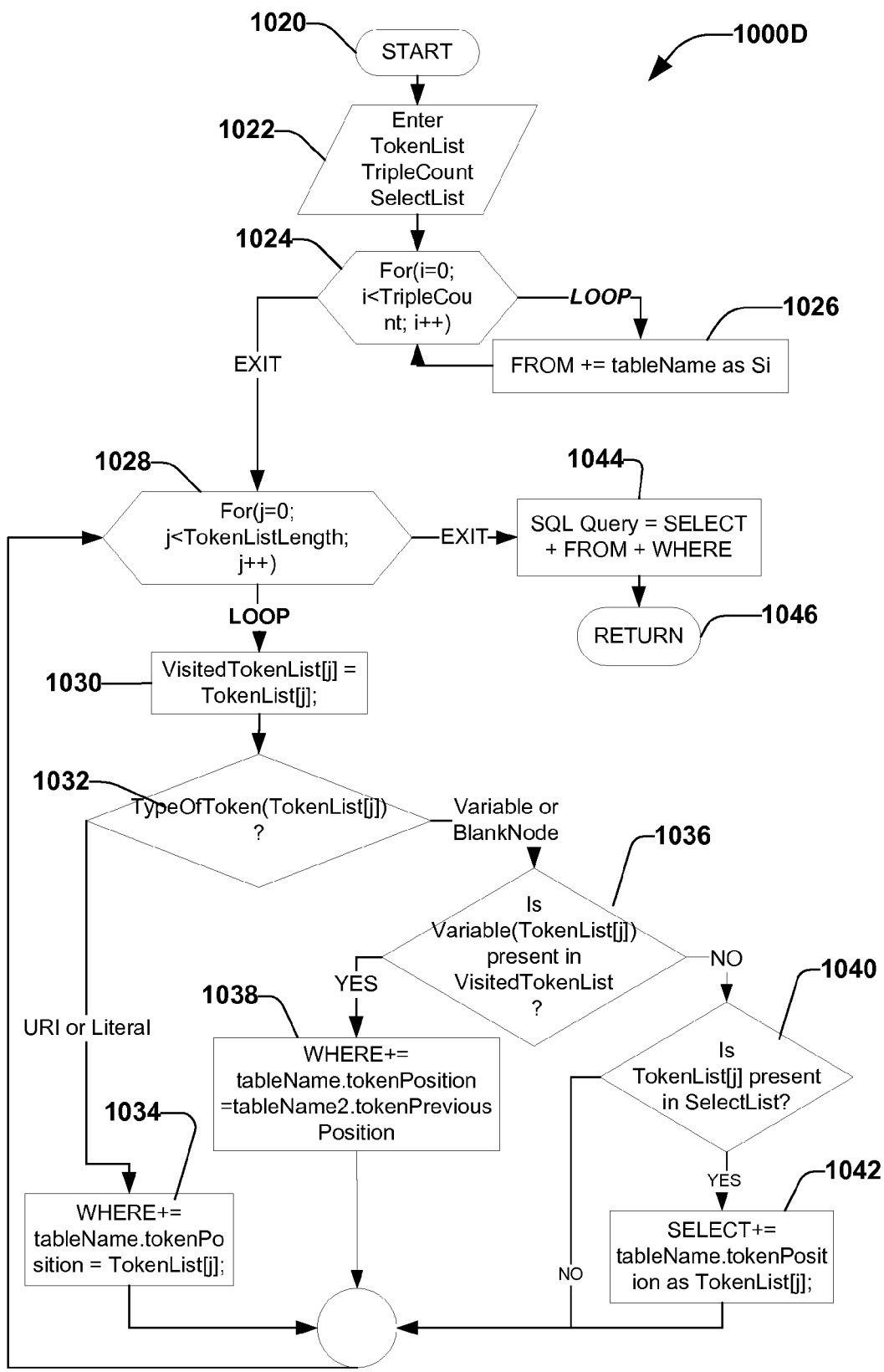
FIG. 10D illustrates an exemplary non-limiting block diagram of a SPARQL to SQL query conversion flowchart according to various embodiments of the present invention.

FIG. 10D illustrates an exemplary non-limiting block diagram of a SPARQL to SQL query conversion flowchart according to various embodiments of the present invention. At 1020, the conversion process can begin. For example, a SPARQL query 1012 can be parsed to create an input list as described above, prior to conversion by the algorithm component 122 of conversion engine 120. In addition, a set of string variables can be initialized for building an output SQL query 1016. At 1022, an input list as described above can be input to the conversion algorithm component 122 of the conversion engine. For example, an input list comprising TokenList, TripleCount, and SelectList can be input to algorithm component 1008 or as described below. At 1024 and 1026, a string variable can facilitate collecting table names suitable for constructing a clause of an output SQL query 1016. For example, a FROM string variable can facilitate collecting table names at 1026 for each triple in a SPARQL query 1012 (e.g., as indexed by input list element TripleCount) for constructing a FROM clause of an output SQL query 1016. For instance, tableName can be the name of a table in which de-normalized RDF data can be stored as a collection of triples, wherein Si facilitates using the same table for each triple by giving an alternative name as Si, where (i) can be triple number inside where{ } clause of an input SPARQL query 1012 (e.g., input list element TripleCount).

At 1028 and 1030 the process can proceed for each token in input list element TokenList, where for example, TokenListLength can be a total number of tokens (e.g., RDF terms) in input list element, TokenList, and VisitedTokenList can be a list of tokens from input list element, TokenList, that have previously been visited in looping through each token in input list element, TokenList. For example, at 1032 a determination can be made to determine what type of is encountered for each token in input list element, TokenList. If at 1032, the type is determined to be of type URI or Literal the process can proceed to 1034.

At 1034, a string variable can facilitate collecting SQL query clause information for constructing a clause of an output SQL query 1016. For instance, a WHERE string variable can facilitate collecting SQL query WHERE clause information for each encountered token in a SPARQL query 1012 (e.g., as indexed by tableName as previously described and tokenPosition, which can indicate respective token position inside the respective triple) for constructing a WHERE clause of an output SQL query 1016. For example, a tokenPosition at first position can be SUBJECT, a tokenPosition at second position can be PREDICATE, and a tokenPosition at third position can be OBJECT. For an example SPARQL Query,

```
SELECT ?v WHERE { ?v <http://example.com/name> "Raman". }
if Literal is "Raman" then,
    tableName = S1 (because "Raman" lies in first triple inside
    where{ } clause),
```

-continued

```
tokenPosition = OBJECT ("Raman" lies at third position), and
thus, WHERE += S1.Object = "'Raman'".
```

Thereafter, the process can return to 1028 to proceed to 1032 to repeat the above described determination of type token encountered for each remaining token in input list element, TokenList.

If at 1032, the token type is determined to be of type BlankNode or Variable the process can proceed to 1036. At 1036, a determination can be made to determine whether the token has been previously encountered. For example, if at 1036, Variable(TokenList[j]) is present in VisitedTokenList, then the token has been previously been visited in looping through each token in input list element, TokenList, and the process can proceed to 1038. At 1038, the WHERE string variable can further facilitate collecting WHERE clause information for each encountered token in a SPARQL query 1012 (e.g., as indexed by tableName and tokenPosition as previously described and tableName2, where tableName2=Sj, where (j) can be the triple number from VisitedTokenList in which this token lies and tokenPreviousPosition can be the position of the token in its triple inside VisitedTokenList.) for constructing a WHERE clause of an output SQL query 1016. For an example SPARQL Query,

```
SELECT ?v WHERE
    { _:a <http://example.com/name> ?v.
      ?v' <http://example.com/address> "Microsoft". }
if Variable is ?v' then,
    tableName = S2 (because this ?v' belongs to second triple),
    tokenPosition = SUBJECT (?v' lies at first position in second triple),
    tableName2 = S1 (because ?v already appeared in first triple),
    tokenPreviousPosition = OBJECT(because previously ?v appeared at
    third position in first Triple), and
    thus, WHERE+= S2.Subject = S1.Object.
```

Thereafter, the process can return to 1028 to proceed to 1032 to repeat the above described determination of type token encountered for each remaining token in input list element, TokenList.

If at 1036, Variable(TokenList[j]) is not present in VisitedTokenList, then the token has not been previously been visited in looping through each token in input list element, TokenList, and the process can proceed to 1040. At 1040, a determination can be made to determine whether the token is included in input list element, SelectList. If at 1040, it is determined that the token is not included in input list element, SelectList, the process can return to 1028 to proceed to 1032 to repeat the above described determination of type token encountered for each remaining token in input list element, TokenList. If at 1040, it is determined that the token is included in input list element, SelectList, the process can proceed to 1042.

At 1042, a string variable can facilitate collecting SQL query clause information for constructing a clause of an output SQL query 1016. For instance, a SELECT string variable can facilitate collecting SQL query SELECT clause information for each encountered token in a SPARQL query 1012 (e.g., as indexed by tableName as previously described and tokenPosition, which can indicate respective token position inside the respective triple) for constructing a WHERE clause of an output SQL query 1016. For an example SPARQL Query,

```
SELECT ?v WHERE { ?v <http://example.com/name> "Raman". }
if Variable is ?v then,
    tableName = S1 (because ?v lies in first triple inside where{ } clause),
    tokenPosition = SUBJECT (?v lies at first position), and
    thus, SELECT += S1.Subject as ?v.
```

Thereafter, the process can return to 1028 to proceed to 1032 to repeat the above described determination of type token encountered for each remaining token in input list element, TokenList.

If at 1032, it is determined that all remaining tokens in input list element, TokenList, have been processed, the process can exit to 1044 to assemble an output SQL query 1016 from the constructed SELECT, FROM, and WHERE string variables. Handling of the query after return at 1046 can then be performed as described herein.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which can be used in connection with RDF store database designs and SPARQL to SQL conversion techniques in accordance with the present invention. The present invention can apply to an environment with server computers and client computers deployed in a network environment or a distributed computing environment, having remote or local storage. The present invention can also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices can have applications, objects or resources that implicate the systems and methods for faster RDF triplet access of the invention.

Figure 11:
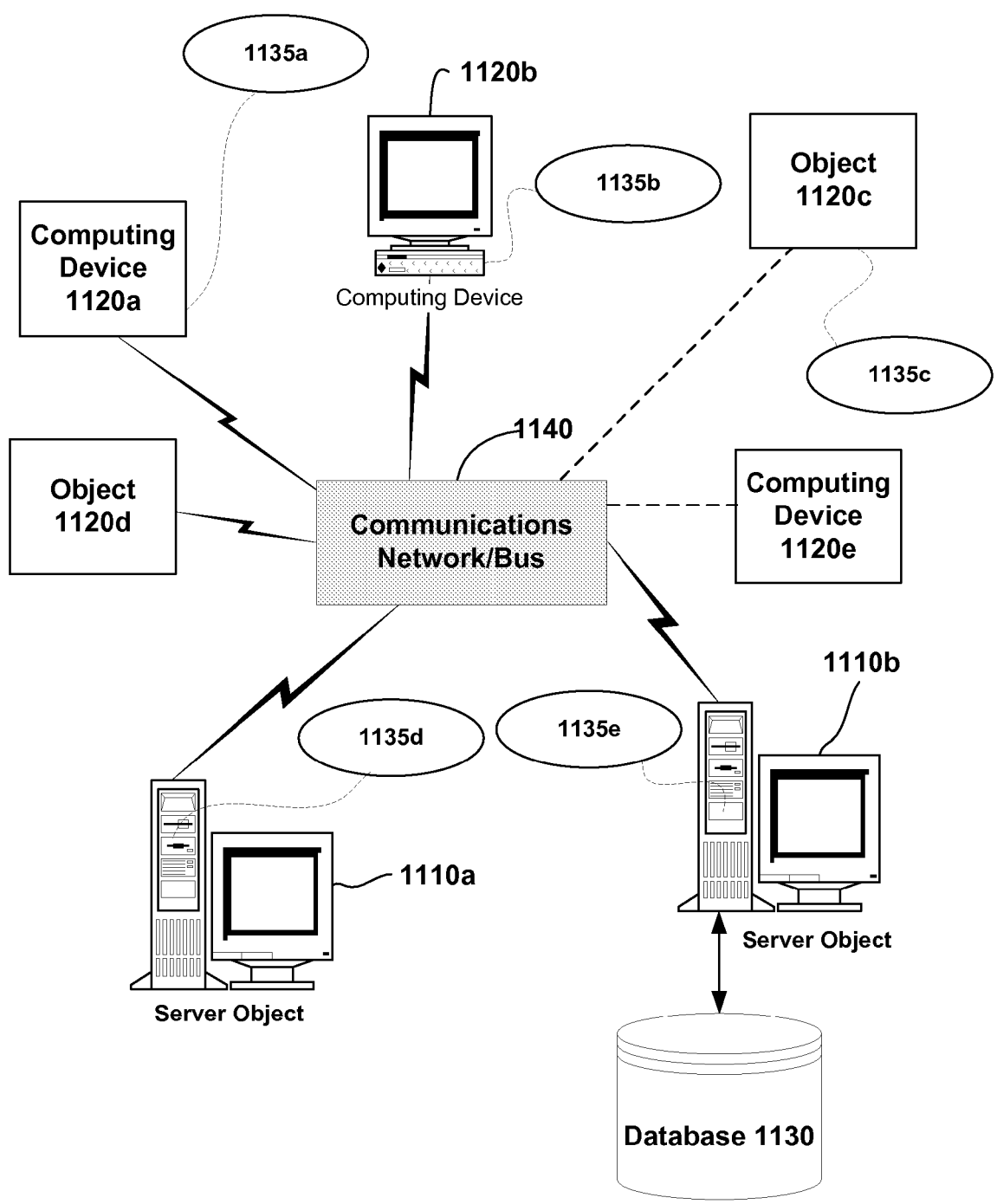
FIG. 11 is a block diagram representing an exemplary non-limiting networked environment in which the present invention may be implemented.

FIG. 11 provides a schematic diagram of an exemplary networked or distributed computing environment. The distributed computing environment comprises computing objects 1110a, 1110b, etc. and computing objects or devices 1120a, 1120b, 1120c, 1120d, 1120e, etc. These objects can comprise programs, methods, data stores, programmable logic, etc. The objects can comprise portions of the same or different devices such as PDAs, audio/video devices, MP3 players, personal computers, etc. Each object can communicate with another object by way of the communications network 1140. This network can itself comprise other computing objects and computing devices that provide services to the system of FIG. 11, and can itself represent multiple interconnected networks. In accordance with an aspect of the invention, each object 1110a, 1110b, etc. or 1120a, 1120b, 1120c, 1120d, 1120e, etc. may contain an application that might make use of an API, or other object, software, firmware and/or hardware, suitable for use with the systems and methods for faster RDF triplet access in accordance with the invention.

It can also be appreciated that an object, such as 1120c, can be hosted on another computing device 1110a, 1110b, etc. or 1120a, 1120b, 1120c, 1120d, 1120e, etc. Thus, although the physical environment depicted may show the connected devices as computers, such illustration is merely exemplary and the physical environment can alternatively be depicted or described comprising various digital devices such as PDAs, televisions, MP3 players, etc., any of which can employ a variety of wired and wireless services, software objects such as interfaces, COM objects, and the like.

There are a variety of systems, components, and network configurations that support distributed computing environments. For example, computing systems can be connected together by wired or wireless systems, by local networks or widely distributed networks. Currently, many of the networks are coupled to the Internet, which provides an infrastructure for widely distributed computing and encompasses many different networks. Any of the infrastructures can be used for exemplary communications made incident to faster RDF triplet access according to the designs of the present invention.

In home networking environments, there are at least four disparate network transport media that can each support a unique protocol, such as Power line, data (both wireless and wired), voice (e.g., telephone) and entertainment media. Most home control devices such as light switches and appliances may use power lines for connectivity. Data Services can enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic can enter the home either as wired (e.g., Cat 3) or wireless (e.g., cell phones) and can be distributed within the home using Cat 3 wiring. Entertainment media, or other graphical data, can enter the home either through satellite or cable and is typically distributed in the home using coaxial cable. IEEE 1394 and DVI are also digital interconnects for clusters of media devices. All of these network environments and others that emerge, or already have emerged, as protocol standards can be interconnected to form a network, such as an intranet, that can be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 11, as an example, computers 1120a, 1120b, 1120c, 1120d, 1120e, etc. can be thought of as clients and computers 1110a, 1110b, etc. can be thought of as servers where servers 1110a, 1110b, etc. maintain the data that is then replicated to client computers 1120a, 1120b, 1120c, 1120d, 1120e, etc., although any computer can be considered a client, a server, or both, depending on the circumstances. Any of these computing devices can be processing data or requesting services or tasks that implicate the RDF store database designs and SPARQL to SQL conversion techniques in accordance with the invention.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques for RDF store database designs and SPARQL to SQL conversion of the invention can be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) can be coupled to one another via TCP/IP connection(s) for high-capacity communication.

Thus, FIG. 11 illustrates an exemplary networked or distributed environment, with server(s) in communication with client computer (s) via a network/bus, in which the present invention can be employed. In more detail, a number of servers 1110a, 1110b, etc. are interconnected via a communications network/bus 1140, which can be a LAN, WAN, intranet, GSM network, the Internet, etc., with a number of client or remote computing devices 1120a, 1120b, 1120c, 1120d, 1120e, etc., such as a portable computer, handheld computer, thin client, networked appliance, or other device, such as a VCR, TV, oven, light, heater and the like in accordance with the present invention. It is thus contemplated that the present invention can apply to any computing device in connection with which it is desirable to provide faster RDF triplet access according to the RDF store database designs and SPARQL to SQL conversion techniques.

In a network environment in which the communications network/bus 1140 is the Internet, for example, the servers 1110a, 1110b, etc. can be Web servers with which the clients 1120a, 1120b, 1120c, 1120d, 1120e, etc. communicate via any of a number of known protocols such as HTTP. Servers 1110a, 1110b, etc. can also serve as clients 1120a, 1120b, 1120c, 1120d, 1120e, etc., as can be characteristic of a distributed computing environment.

As mentioned, communications can be wired or wireless, or a combination, where appropriate. Client devices 1120a, 1120b, 1120c, 1120d, 1120e, etc. may or may not communicate via communications network/bus 14, and can have independent communications associated therewith. For example, in the case of a TV or VCR, there may or may not be a networked aspect to the control thereof. Each client computer 1120a, 1120b, 1120c, 1120d, 1120e, etc. and server computer 1110a, 1110b, etc. can be equipped with various application program modules or objects 135a, 135b, 135c, etc. and with connections or access to various types of storage elements or objects, across which files or data streams can be stored or to which portion(s) of files or data streams can be downloaded, transmitted or migrated. Any one or more of computers 1110a, 1110b, 1120a, 1120b, 1120c, 1120d, 1120e, etc. can be responsible for the maintenance and updating of a database 1130 or other storage element, such as a database or memory 1130 for storing data processed or saved according to the invention. Thus, the present invention can be utilized in a computer network environment having client computers 1120a, 1120b, 1120c, 1120d, 1120e, etc. that can access and interact with a computer network/bus 1140 and server computers 1110a, 1110b, etc. that can interact with client computers 1120a, 1120b, 1120c, 1120d, 1120e, etc. and other like devices, and databases 1130.

Exemplary Computing Device

Figure 12:
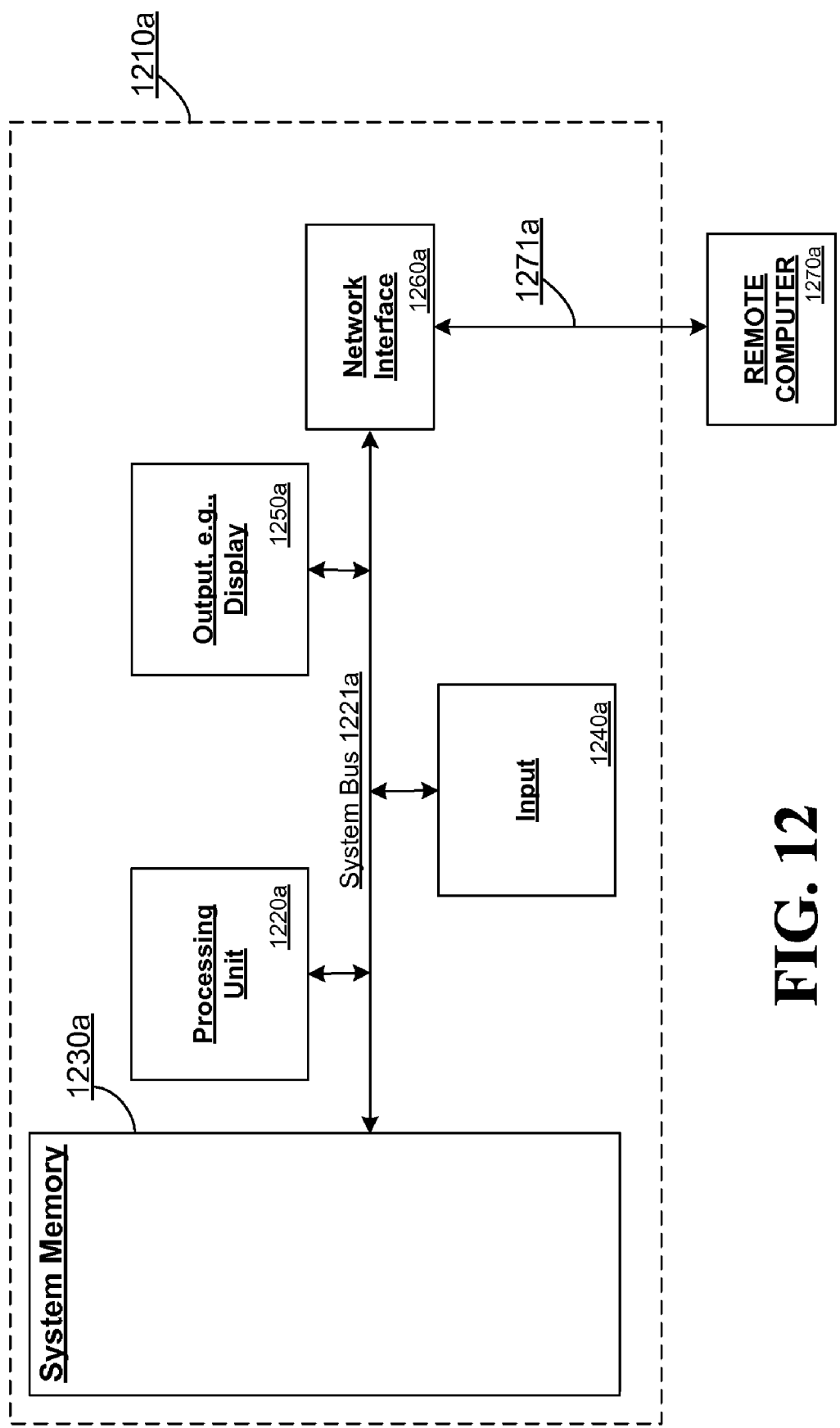
FIG. 12 is a block diagram representing an exemplary non-limiting computing system or operating environment in which the present invention may be implemented.

As mentioned, the invention applies to any device wherein it can be desirable to provide faster RDF triplet access. It should be understood, therefore, that handheld, portable and other computing devices and computing objects of all kinds are contemplated for use in connection with the present invention, i.e., anywhere that a device can provide or request RDF triplet access or otherwise receive, process or store data. Accordingly, the below general purpose remote computer described below in FIG. 12 is but one example, and embodiments of the present invention may be implemented with any client having network/bus interoperability and interaction. Thus, the present invention can be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer executable instructions, such as program modules, being executed by one or more computers, such as client workstations, servers or other devices. Those skilled in the art will appreciate that the invention can be practiced with other computer system configurations and protocols.

FIG. 12 thus illustrates an example of a suitable computing system environment 1200a in which the invention can be implemented, although as made clear above, the computing system environment 1200a is only one example of a suitable computing environment for a media device and is not intended to suggest any limitation as to the scope of use or functionality of the invention. Neither should the computing environment 1200a be interpreted as having any dependency or requirement relating to any one or combination of components illustrated in the exemplary operating environment 1200a.

With reference to FIG. 12, an exemplary remote device for implementing the invention includes a general purpose computing device in the form of a computer 1210a. Components of computer 1210a can include, but are not limited to, a processing unit 1220a, a system memory 1230a, and a system bus 1221a that couples various system components including the system memory to the processing unit 1220a. The system bus 1221a can be any of several types of bus structures including a memory bus or memory controller, a peripheral bus, and a local bus using any of a variety of bus architectures.

Computer 1210a typically includes a variety of computer readable media. Computer readable media can be any available media that can be accessed by computer 1210a. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210a. Communication media typically embodies computer readable instructions, data structures, program modules or other data in a modulated data signal such as a carrier wave or other transport mechanism and includes any information delivery media.

The system memory 1230a can include computer storage media in the form of volatile and/or nonvolatile memory such as read only memory (ROM) and/or random access memory (RAM). A basic input/output system (BIOS), containing the basic routines that help to transfer information between elements within computer 1210a, such as during start-up, can be stored in memory 1230a. Memory 1230a typically also contains data and/or program modules that are immediately accessible to and/or presently being operated on by processing unit 1220a. By way of example, and not limitation, memory 1230a can also include an operating system, application programs, other program modules, and program data.

The computer 1210a can also include other removable/non-removable, volatile/nonvolatile computer storage media. For example, computer 1210a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1221a through a non-removable memory interface such as an interface, and a magnetic disk drive or optical disk drive is typically connected to the system bus 1221a by a removable memory interface, such as an interface.

A user can enter commands and information into the computer 1210a through input devices such as a keyboard and pointing device, commonly referred to as a mouse, trackball or touch pad. Other input devices can include a microphone, joystick, game pad, satellite dish, scanner, or the like. These and other input devices are often connected to the processing unit 1220a through user input 1240a and associated interface (s) that are coupled to the system bus 1221a, but can be connected by other interface and bus structures, such as a parallel port, game port or a universal serial bus (USB). A graphics subsystem can also be connected to the system bus 1221a. A monitor or other type of display device is also connected to the system bus 1221a via an interface, such as output interface 1250a, which can in turn communicate with video memory. In addition to a monitor, computers can also include other peripheral output devices such as speakers and a printer, which can be connected through output interface 1250a.

The computer 1210a can operate in a networked or distributed environment using logical connections to one or more other remote computers, such as remote computer 1270a, which can in turn have media capabilities different from device 1210a. The remote computer 1270a can be a personal computer, a server, a router, a network PC, a peer device or other common network node, or any other remote media consumption or transmission device, and can include any or all of the elements described above relative to the computer 1210a. The logical connections depicted in FIG. 12 include a network 1271a, such local area network (LAN) or a wide area network (WAN), but can also include other networks/buses. Such networking environments are commonplace in homes, offices, enterprise-wide computer networks, intranets and the Internet.

When used in a LAN networking environment, the computer 1210a is connected to the LAN 1271a through a network interface or adapter. When used in a WAN networking environment, the computer 1210a typically includes a communications component, such as a modem, or other means for establishing communications over the WAN, such as the Internet. A communications component, such as a modem, which can be internal or external, can be connected to the system bus 1221a via the user input interface of input 1240a, or other appropriate mechanism. In a networked environment, program modules depicted relative to the computer 1210a, or portions thereof, can be stored in a remote memory storage device. It will be appreciated that the network connections shown and described are exemplary and other means of establishing a communications link between the computers can be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention can also be implemented via an operating system, or a "middle man" object, a control object, hardware, firmware, intermediate language instructions or objects, etc., such that the RDF store database designs and SPARQL to SQL conversion techniques in accordance with the invention can be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the RDF store database designs and SPARQL to SQL conversion techniques and related systems and methods of the invention. The invention contemplates the use of the invention from the standpoint of an API (or other software object), as well as from a software or hardware object that provides access to an RDF data store in accordance with the invention. Thus, various implementations of the invention described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts can be applied to any computing device or system in which it is desirable to provide faster RDF triplet access. For instance, the RDF store database designs and SPARQL to SQL conversion techniques of the invention can be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. One or more components can reside within a process and/or thread of execution and a component can be localized on one computer and/or distributed between two or more computers.

Thus, the methods and apparatus of the present invention, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that can implement or utilize the RDF store database designs and SPARQL to SQL conversion techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language can be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, portions of the disclosed subject matter can be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

In view of the exemplary systems described supra, methodologies that can be implemented in accordance with the disclosed subject matter will be better appreciated with reference to the flowcharts of FIGS. 3 and 9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks may be required to implement the methodologies described hereinafter.

Furthermore, as will be appreciated various portions of the disclosed systems and methods can include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments can be used or modifications and additions can be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application can apply to any computing device or environment, such as a gaming console, handheld computer, portable computer, etc., whether wired or wireless, and can be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any suitable language to provide RDF store database designs, SPARQL to SQL conversion techniques, and related methods. Still further, the present invention can be implemented in or across a plurality of processing chips or devices, and storage can similarly be effected across a plurality of devices. Therefore, the present invention should not be limited to any single embodiment, but rather should be construed in breadth and scope in accordance with the appended claims.

What is claimed is:

1. A query conversion method for querying Resource Description Framework metadata stored in a relational database, the method comprising using a processor coupled to a memory to perform the following operations:
   storing the Resource Description Framework metadata as an information resource in a de-normalized table in the relational database;
   organizing the de-normalized table to include a Graph Table that stores named graphs with respective identification numbers, and a Statement Table that stores the information resource as a subject, predicate and object triplet;
   assigning to the subject, predicate and object, respectively, a corresponding subject type attribute value, predicate type attribute value and object type attribute value;
   assigning, to each of the subject type attribute value, predicate type attribute value and object type attribute value, a corresponding integrity check value including a checksum value;
   storing, in the Statement Table, an indication of whether the information resource can be reified;
   receiving a query substantially conforming to a Simple Protocol and Resource Description Framework Query Language, the query comprising a where clause, the where clause comprising a plurality of Resource Description Framework terms;
   parsing the query;
   converting the query into a structured query language query by applying a conversion algorithm; and
   querying the de-normalized table with the structured query language query.

2. The method of claim 1, the method further comprising:
   parsing the query to facilitate performing a pre-conversion setup task.

3. The method of claim 2, the method further comprising:
   performing the pre-conversion setup task by generating a token list, the token list comprises a list of the plurality of Resource Description Framework terms of the where clause.

4. The method of claim 2, the where clause further comprises one or more triples, the method further comprising:
   performing the pre-conversion setup task by creating a count of triples, the count of triples is the total number of the one or more triples.

5. The method of claim 2, the method further comprising:
   performing the pre-conversion setup task by creating a list of variables to be selected by the query.

6. The method of claim 2, the method further comprising:
   passing results of the pre-conversion setup task to the conversion algorithm.

7. The method of claim 1, the structured query language query having one or more structured query language query clauses, the method further comprising:
building the structured query language query by assembling the one or more structured query language query clauses into one or more associated string variables, from the plurality of Resource Description Framework terms.

8. The method of claim 7, the method further comprising: assembling the one or more structured query language query clauses including assembling one or more of a FROM, WHERE, or a SELECT clause.

9. The method of claim 1, the method further comprising: converting the query into a structured query language query by applying the conversion algorithm including determining a type for Resource Description Framework terms, wherein the type comprises one of a literal, uniform resource identifier, blank, or variable.

10. A computing device configured to perform the method of claim 1.

11. A database management system comprising a computing device for performing the method of claim 1.

12. An apparatus to facilitate conversion of a Simple Protocol and Resource Description Framework Query Language query to a structured query language query, the apparatus comprising at least one processor coupled to at least one machine-readable storage medium storing instructions executable by the at least one processor to implement:
a conversion engine configured to receive a Simple Protocol and Resource Description Framework Query Language query, the query comprising a where clause, the where clause comprising a plurality of Resource Description Framework terms;
an algorithm component for converting the query into a structured query language query, wherein the structured query language query is configured to query a relational database storing data in at least one de-normalized database table, the de-normalized database table including
a Graph Table storing named graphs with respective identification numbers, and a Statement Table storing Resource Description Framework data as an information resource defined in terms of a subject, predicate and object,
the subject, predicate and object, respectively, having a corresponding subject type attribute value, predicate type attribute value and object type attribute value,
each of the subject type attribute value, predicate type attribute value and object type attribute value having a corresponding integrity check value including a checksum value,
the Statement Table further storing an indication of whether the information resource can be reified.

13. The apparatus of claim 12, the apparatus further comprising:
a parsing component configured to parse the query to facilitate performing a setup task prior to converting the query.

14. The apparatus of claim 13, the where clause further comprises one or more triples, the setup task includes one or more of generating a token list, creating a count of triples, or creating a list of variables to be selected by the query, the token list comprises a list of the plurality of Resource Description Framework terms of the where clause, and the count of triples is the total number of the one or more triples.

15. The apparatus of claim 13, the conversion engine is further configured to communicate information associated with the setup task to the algorithm component to facilitate converting the query into a structured query language query.

16. The apparatus of claim 12, the conversion engine is further configured to build the structured query language query by assembling one or more structured query language query clauses into one or more associated string variables, based in part on the plurality of Resource Description Framework terms.

17. A computer-readable storage medium tangibly embodying computer-executable instructions for conversion of a Simple Protocol and Resource Description Framework Query Language query to a structured query language query, the computer-executable instructions if executed by a computer performing a method comprising:
converting Resource Description Framework data into a de-normalized table;
organizing the de-normalized table to include a Graph Table that stores named graphs with respective identification numbers, and a Statement Table that stores an information resource as a subject, predicate and object triplet;
assigning to the subject, predicate and object, respectively, a corresponding subject type attribute value, predicate type attribute value and object type attribute value;
assigning, to each of the subject type attribute value, predicate type attribute value and object type attribute value, a corresponding integrity check value including a checksum value;
storing, in the Statement Table, an indication of whether the information resource can be reified;
receiving a query substantially conforming to a Simple Protocol and Resource Description Framework Query Language, the query comprising a where clause, the where clause comprising a plurality Resource Description Framework terms and one or more triples;
parsing the query to perform setup tasks prior to query conversion, the setup task includes one or more of generating a token list, creating a count of triples, or creating a list of variables to be selected by the query, the token list comprises a list of the plurality of Resource Description Framework terms of the where clause, and the count of triples is the total number of the one or more triples;
applying conversion algorithm logic to convert the query into a structured query language query; and
applying the structured query language query to the de-normalized table.

18. The computer readable medium of claim 17, the method further comprising determining a type for Resource Description Framework terms, wherein the type comprises one of a literal, uniform resource identifier, blank, or variable.

19. The computer readable medium of claim 17, the method further comprising building the structured query language query by assembling one or more structured query language query clauses into one or more associated string variables.

20. The computer readable medium of claim 19, the method further comprising including one or more of a FROM, WHERE, or a SELECT clause in the one or more structured query language query clauses.

* * * * *